United States Patent [19]

Yoshino et al.

[11] Patent Number: 5,336,300

[45] Date of Patent: Aug. 9, 1994

[54] METHOD AND APPARATUS FOR SEPARATING MIXED GAS

[75] Inventors: Akira Yoshino; Hiromi Kiyama; Nobuhiko Mihoichi, all of Osaka, Japan

[73] Assignee: Daidousanso Co., Ltd., Osaka, Japan

[21] Appl. No.: 14,998

[22] Filed: Feb. 8, 1993

[30] Foreign Application Priority Data

Feb. 8, 1992 [JP] Japan .................. 4-056659

[51] Int. Cl.⁵ .............................................. B01D 53/08
[52] U.S. Cl. .................................. 95/96; 95/106; 95/110; 95/115; 95/130; 96/128; 96/146; 96/150
[58] Field of Search ................. 55/25, 26, 34, 58, 60, 55/79, 179, 181, 390

[56] References Cited

U.S. PATENT DOCUMENTS

| | | | |
|---|---|---|---|
| 2,311,564 | 2/1943 | Munday | 55/79 X |
| 2,434,202 | 1/1948 | Evans et al. | 55/79 X |
| 2,495,842 | 1/1950 | Gilliland | 55/26 |
| 2,527,964 | 10/1950 | Robinson | 55/60 |
| 2,539,005 | 1/1951 | Berg | 55/79 X |
| 2,539,006 | 1/1951 | Berg | 55/79 X |
| 2,549,104 | 4/1951 | Lechthaler | 55/26 |
| 2,583,352 | 1/1952 | Berg | 55/60 |
| 2,590,322 | 3/1952 | Imhoff et al. | 55/26 |
| 2,594,615 | 4/1952 | Berg | 55/58 |
| 2,603,306 | 7/1952 | Berg | 55/26 |
| 2,616,515 | 11/1952 | Berg | 55/60 |
| 2,616,521 | 11/1952 | Berg | 55/60 |
| 2,638,999 | 5/1953 | Berg | 55/34 X |
| 2,692,656 | 10/1954 | Berg | 55/26 |
| 2,764,252 | 9/1956 | Berg | 55/26 X |
| 2,780,526 | 2/1957 | Fleck | 55/25 X |
| 2,850,114 | 9/1958 | Kehde et al. | 55/26 |
| 3,553,937 | 1/1971 | Agneray et al. | 55/60 |
| 4,047,906 | 9/1977 | Murakami et al. | 55/79 |
| 4,207,082 | 6/1980 | Okamoto et al. | 55/60 |
| 4,231,764 | 11/1980 | Mattia | 55/60 X |
| 4,302,221 | 11/1981 | Tanaka | 55/60 X |
| 4,306,886 | 12/1981 | Clyde | 55/60 X |

FOREIGN PATENT DOCUMENTS 0293688 12/1988 European Pat. Off. .
883589 3/1954 Fed. Rep. of Germany .
WO92/03224 3/1992 PCT Int'l Appl. .

OTHER PUBLICATIONS

European Search Report of May 25, 1993, for EP Appln. No. 93 30 0894, The Hague.

*Primary Examiner*—Robert Spitzer
*Attorney, Agent, or Firm*—Armstrong, Westerman, Hattori, McLeland & Naughton

[57] ABSTRACT

A method and an apparatus for separating a specific component gas from a mixed gas, wherein granular adsorbent is held in a sealed space in a layered state, easily adsorptive gas is adsorbed to the granular adsorbent by blowing material mixed gas into the adsorbent layers and contacting the granular adsorbent with a counter-current of material gas, and the granular adsorbent is transferred gradually out of the sealed space, and reactivated by desorbing the easily adsorptive gas from the granular adsorbent, and the reactivated granular adsorbent is returned to the inside of the sealed space to be reused. Therefore, frequent actions of opening and closing valves are unnecessary, so that it is possible to separate and produce excellent product gas with high purity.

4 Claims, 4 Drawing Sheets

METHOD AND APPARATUS FOR SEPARATING MIXED GAS

FIELD OF THE INVENTION

The present invention relates to a method of separating mixed gas such as a method of separating oxygen and nitrogen from air and a method of separating a specific active ingredient from exhaust gas, and an apparatus used therefor.

BACKGROUND OF THE INVENTION

Although there are various methods for separating specific component gas (product gas) such as nitrogen and oxygen from a mixed gas such as air, a method of separation using an adsorbent has been recently employed widely for its ease of designing an apparatus and low cost of equipment. Such a method of separation using an adsorbent is generally called the PSA method, wherein plural adsorption towers are filled with adsorbent, and operations such as supply of a mixed gas to these adsorption towers, adsorption of specific component gas, desorption of specific component gas, and reactivation of the absorbent are conducted by alternately switching of valves. The supply of material gas is conducted in pressurized condition and desorption of the specific component gas is conducted in normal pressure or by vacuum suction. In an apparatus for the PSA method, the number of times in which the opening and closing valves are required is extremely high, since the above-mentioned operations are conducted one after another, which shortens life duration of the valves, and, at the same time, the intensively frequent switching of the valves increases fluctuations of pressure in the adsorption towers. As a result, a difficult point arises, that is, an increment of fluctuations of the purity of the specific component gas. Also, when the pressure is equalized and the like, the occurrence of noise by the instantaneous inflow of large quantity of gas is unavoidable. Moreover, each adsorption tower is required to be arranged on a same plane in the apparatus, so that the apparatus requires a very large space.

OBJECT OF THE INVENTION

It is an object of the present invention to omit the frequent actions of opening and closing valves, to dispel the unevenness of purity caused by fluctuations of pressure, to reduce noise, to implement high yield, and to save space.

SUMMARY OF THE INVENTION

To achieve the above-mentioned object, a first embodiment of the invention is directed to a method for separating mixed gas which comprises a hold up process for holding granular absorbent in a sealed space in a layered state, adsorption-separation process for blowing out material mixed gas from nozzles extending into the above granular absorbent layers, for adsorbing that is easily adsorbed to the granular absorbent, and for leaving gas that is hardly adsorbed, a transfer process for transferring the above-mentioned granular absorbent held in the above layered state gradually to the other sealed space than the above sealed space, a desorption-reactivation process for desorbing gas that is easily adsorbed from the granular absorbent in the above-mentioned other sealed space and for reactivating the granular absorbent, and a return process for returning the reactivated granular absorbent to the above-mentioned hold up process. And a second embodiment of the invention is directed to the method of separating a mixed gas comprising an adsorption tower containing granular adsorbent, a reactivation means for the granular adsorbent, a means for supplying mixed gas by introducing the material gas to the above adsorption tower, and an efferent means for leading the gas separated from the mixed gas, wherein partitioning plates are installed in the above-mentioned adsorption tower, the granular adsorbent is held on the partitioning plates in a layered state contacting counter-current of ascending gas and is to be gradually transferred to the next process, an end of the above-mentioned means for supplying mixed gas is connected with a part of the adsorption tower that is beneath the partitioning plate, a return means for the reactivated adsorbent is installed between the above-mentioned reactivation means and adsorption tower, nozzles for blowing out mixed gas and flow holes for flowing down the granular adsorbent are installed, and the opening ends of the nozzles are positioned in the layers of the above granular adsorbent preventing admission of the granular adsorbent.

In the present invention, not alike the PSA method currently in use wherein the adsorbent is fixed in the adsorption towers, the granular adsorbent is held in the sealed space such as adsorption space in the adsorption tower, the mixed gas to be the material gas is blown out of nozzles into the granular adsorbent held in the layers, and the above adsorbent is contacted with counter-current of the mixed gas by the pressure of the blowout, so that the easily adsorptive gas in the mixed gas is adsorbed to the adsorbent. Then, the adsorbent which adsorbed said easily adsorptive gas is gradually transferred to the other space such as a desorption-reactivation vessel than said space and desorbs the easily adsorptive gas there, and the adsorbent is reactivated at the same time. And, the reactivated adsorbent is returned to the first sealed space to reuse circularly. In this way, the large number of valves and frequent opening and closing of the valves that is required in the PSA methods are unnecessary, and fluctuations of pressure are significantly reduced to eliminate uneven purity of product gas in the present invention since adsorption and desorption of easily adsorptive gas are conducted for recyclable use during the process of transference of the granular adsorbent in the invention. Moreover, in accordance with the invention, the adsorbent contacts with the mixed gas only statically in the above-mentioned sealed space because the adsorbent is held in the adsorbent spaces of the adsorbent tower and tile like in a layered state, and the material mixed gas is blown out of the nozzles, which can suppress powdering phenomenon of the adsorbent caused by an impact of sudden transference of the adsorbent.

The present invention is now described in further detail.

As separation of the mixed gas which the present invention intends for, there are, for example, concentration and recovery of specific effective gas ($H_2$, CO, hydrocarbon, and the like, for example) from air or the mixed gas in a production process for industrial gas, purification of gas containing harmful gas, and the like.

Also, as the granular adsorbent employed in the invention, there are zeolite, silica gel, activated alumina, activated carbon, and the like, and they are used independently or in combination. For example, zeolite molecular sieve as the adsorbent for nitrogen, carbon molecular sieve as the adsorbent for oxygen, and zeolite molecular sieve for carbon dioxide, and the like are employed.

Also, silica gel and activated alumina are suitably employed dehumidification, and activated carbon and the like are used for the adsorption of hydrocarbon in air. These adsorbents are needed to be in a granulated state for they are required to be able to transfer. In the invention, a granulated state signifies that the adsorbent itself is formed to be able to transfer, and neither shape nor dimension of the granule has to be brought up as the matter. For example, it will not interfere with the invention whether or not tile shape is flat, pellet, fine grain, or ultra fine powder, although a sphere is preferred.

Following is a description of examples of the embodiments.

EXAMPLES

Figure 1:
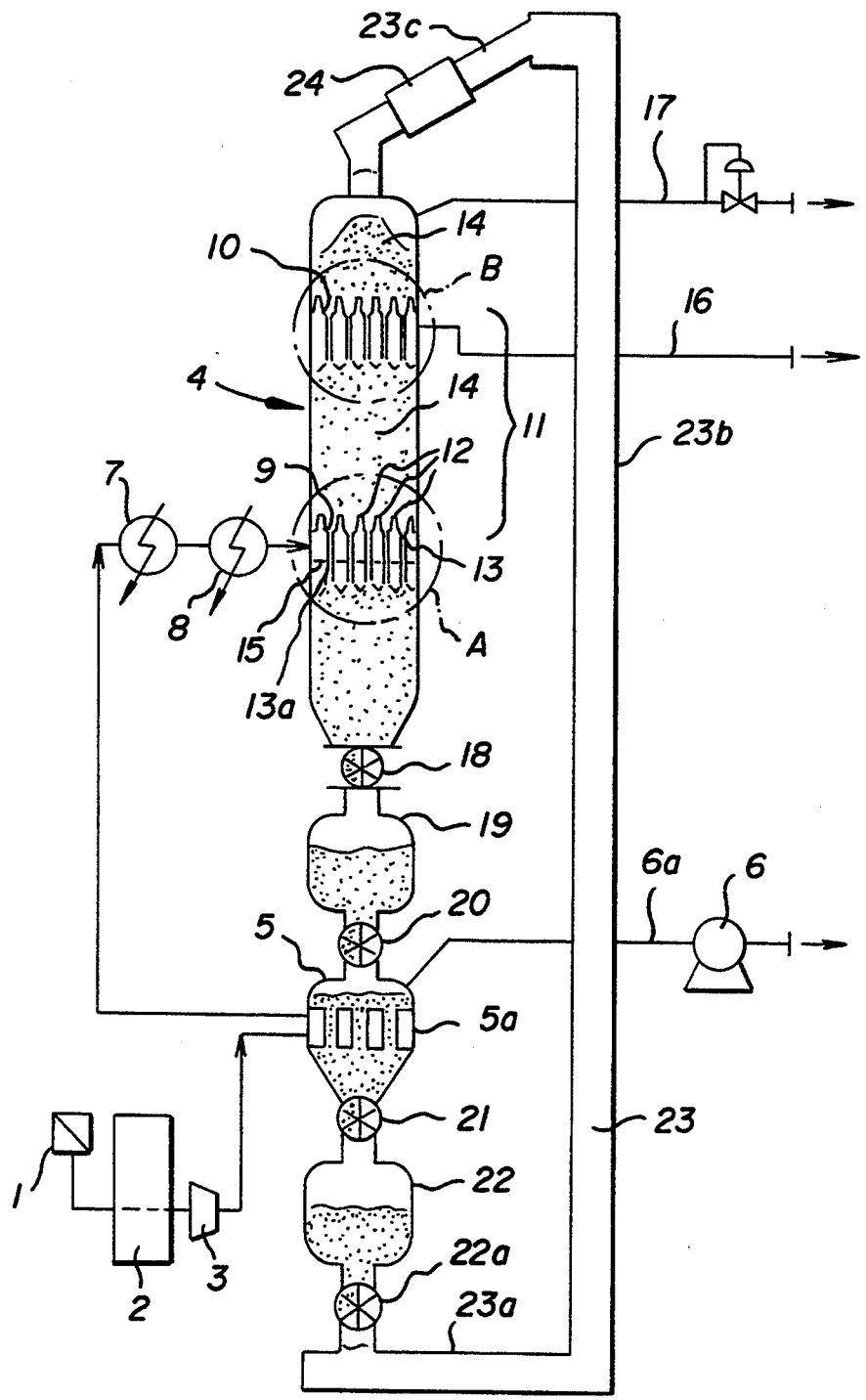
FIG. 1 is a schematic process diagram showing an embodiment of the present invention.
Figure 2:
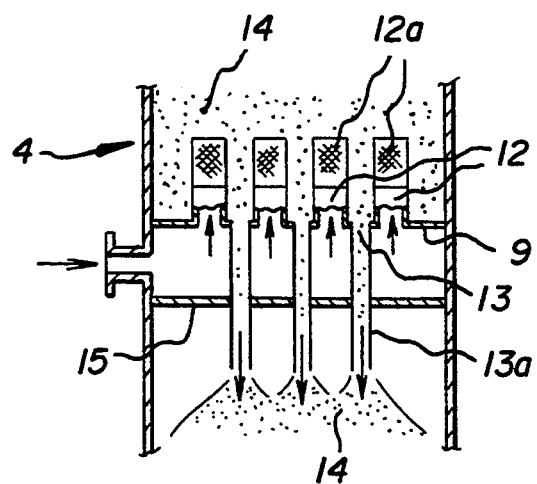
FIG. 2 is an enlarged view of a part A circled in FIG. 1.
Figure 3:
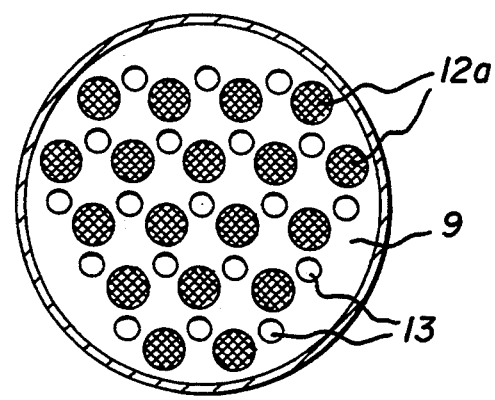
FIG. 3 is an enlarged plane view of said part A in FIG. 1.
Figure 4:
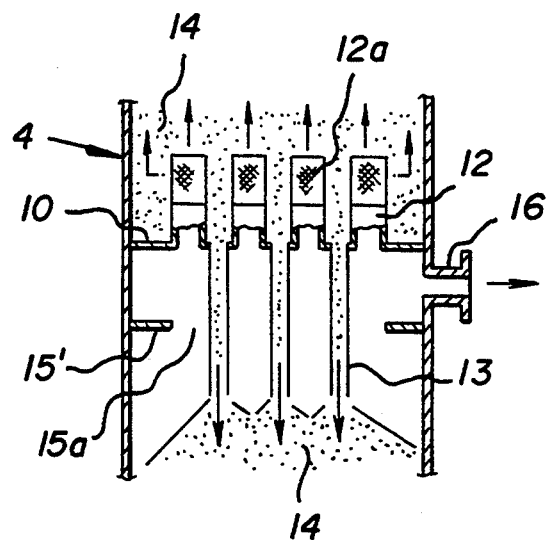
FIG. 4 is an enlarged view of a part B circled in FIG. 1.
Figure 5:
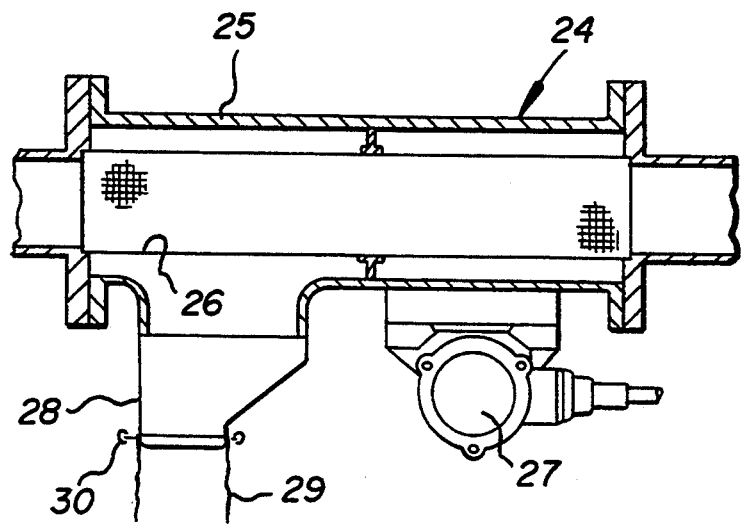
FIG. 5 is an enlarged sectional view of a classifier 24.

FIG. 1 shows an example of separating oxygen in air as a product gas wherein air is employed as mixed gas (material). In the figure, material air is compressed in a blower 3 drawn by way of an air filter 1 and a continuous dehumidifier of adsorption system 2, and fed into a heat exchanger 5a in an adsorption-reactivation vessel 5 installed beneath an adsorption tower 4. In the adsorption-reactivation vessel 5, nitrogen gas (easily absorptive gas) is desorbed from a granular adsorbent (will be abbreviated as 'adsorbent' hereinafter) 14, which adsorbed nitrogen in the adsorption tower 4, in order to reactivate the adsorbent 14, and the adsorption-reactivation vessel 5 is constantly kept in a decompressed state by a vacuum pump 6. The heat exchanger 5a heats said adsorbent 14, and stimulates the desorption of nitrogen. That is, the adsorbent 14 is exothermic when it adsorbs gas, and endothermic when it desorbs. Therefore, nitrogen gas gets hardly desorbed when a temperature of the adsorbent 14 declines with an advance of desorption in the above-mentioned adsorption-reactivation vessel 5. In the present example, the above heat exchanger 5a carries heat of compression from the blower 3 with the material air, and said adsorbent 14 is heated by the heat of compression, which suppresses the temperature fall of the adsorbent 14. Consequently, a desorbing speed and the like of the adsorbent 14 do not decrease. The air material which accordingly heated the adsorbent 14 is cooled by an after cooler 7, cooled still more in a water cooled cooling system 8, and led into the adsorption tower 4 at a temperature controlled within a range of $-40°$ C. to $40°$ C. Inner space of said adsorption tower is vertically divided into three spaces by a couple of partitioning plates 9 and 10, and the space between the partitioning plates 9 and 10 is designed to be adsorption space 11. Plural number of nozzles 12 to blow out the material air and flow holes 13 to flow down the adsorbent 14 gradually are formed at the above-mentioned partitioning plate 9 shown in FIG. 2 and the plane view, FIG. 3. Wire gauzes 12a cover opening ends of the nozzles 12 in order to prevent admission of the adsorbent 14. Also, flow nozzles 13a extend downwardly from flow holes 13 to flow down the adsorbent 14 evenly dispersing in the space. Reference numeral 15 is a shielding plate installed to form a space under the partitioning plate 9 for introducing the material air, and said flow nozzles 13a extend downward through the shielding plate 15. The adsorbent 14 stored on the partitioning plate 9 is contacted and adsorbed by the blowout pressure of the material air, and flows downward in order of the lower part of the adsorbent by way of the flow holes 13 and the flow nozzles 13a. The adsorbent 14 flowing downward has adsorbed nitrogen gas by the above-mentioned contact adsorption in the adsorption space 11. In the upper space of the adsorption space 11, oxygen gas is held. That is, the nitrogen gas of the material air is desorbed and eliminated by said adsorbent 14, and, as a result, oxygen gas remains and is stored in the upper part of the adsorption space 11. Reference numeral 16 is a product oxygen withdrawal pipeline 16 for withdrawing the oxygen gas as product oxygen gas. The partitioning plate 10 forming a ceiling of the adsorption space 11 has a structure shown in FIG. 4. In the same way as the partitioning plate 9 shown in FIG. 2, the nozzles 12 covered with the wire gauzes 12a and the flow holes 13 installed with the flow nozzles 13a are provided at the partitioning plate 10. Only, a cutting hole 15a is formed at the center of a shielding plate 15', and a part of the oxygen gas held at the upper part of the adsorption space 11 is introduced thereto. The introduced oxygen gas is discharged through an exhaust pipe 17 to outside by way of the nozzles 12 and the upper space in the vessel of the adsorbent 14. In this way, pressure in the adsorption tower 4 is kept almost equally. In the adsorption tower 4, the adsorbent 14 (nitrogen gas is absorbed) flows downward through flow holes 13 and the nozzles 13a installed at the partitioning plate 9 down to a first buffer vessel 19 by a rotary valve 18 always rotating counterclockwise at a constant speed. The first buffer vessel 19 is located between the adsorption tower 4 and the above-mentioned desorption-reactivation vessel 5, and has an effect of keeping a vacuum state of the desorption-reactivation vessel 5. Another rotary valve 20 always rotating counterclockwise at a constant speed is installed beneath the above-mentioned first buffer vessel 19, which gradually transfers the adsorbent 14 in the first buffer vessel 19 into the desorption-reactivation vessel 5. As mentioned hereinbefore, the desorption-reactivation vessel 5 is decompressed by vacuum power of suction of the vacuum pump 6 to be in a decompression state (preferably 10 to 500 torr), and heated by an effect of the heat exchanger 5a, so that desorption of the nitrogen gas is efficiently conducted. The reactivated adsorbent 14, wherein the nitrogen gas is desorbed, is transfered to a second buffer vessel 22 by a rotary valve 21 always rotating counterclockwise at a constant speed which is installed beneath the desorption-reactivation vessel 5. The second buffer vessel 22 is provided so that the pressure in the adsorption tower 4 does not directly influence the inside of the desorption-reactivation vessel 5 through a carrier system 23. And, fourth rotary valve 22a always rotating counterclockwise at a constant speed is also installed beneath the second buffer vessel 22 in order to constantly supply the determined amount of reactivated adsorbent into the carrier system 23. In the carrier system, a belt conveyor for conveyance (not shown in the figure) is provided at a horizontal section 23a, and a bucket conveyor (not shown in the figure) is provided at a vertical section 23b. The adsorbent 14 is transferred horizontally, then vertically to be returned to the upper part of the adsorption tower 4. A classifier 24 is installed on the upper section 23c of the carrier system 23 with an object of preventing transfer condition of the adsorbent from change, which classifies and eliminates the adsorbent 14 crushed and powdered in the process of the above-mentioned transfer, and prevents the transfer condition from the change caused by interminglement of the powdered adsorbent. Said classifier 24 is structured as shown in FIG. 5. That is, the classifier 24 comprises an external cylinder 25 and an internal cylinder 26, and the internal cylinder 26 is formed out of wire gauze. A low-frequency vibrating motor 27 is installed under the external cylinder 25 so that both external and internal cylinders 25 and 26 are vibrated. A reducer 28 installed beneath the external cylinder 26 withdraws the classified powder adsorbent to outside through a hose 29. Reference numeral 30 is a hose band connecting said hose with the reducer 28. The above-mentioned classifier 24 can be vibrated with its right and left sides connected with the carrier system 23 through rubber hoses (not shown in the figure). The adsorbent 14 reactivated in this way is supplied to the upper part of the adsorption tower 4 and reused as mentioned hereinbefore.

The purity of the product oxygen gas obtained as mentioned hereinbefore was 95.1%, which is an excellent record. On the other hand, the purity of, the oxygen gas obtained by employing a triple-tower PSA apparatus currently in use filled with zeolite molecular sieve Was 93% (said PSA apparatus has the same performance as the apparatus for separating gas mentioned above as the example). Also, the yield in a fixed-bed PSA was about 50% while the yield in the present example was 92%, which is very high.

Although the obtained nitrogen gas is vacuum-exhausted by the vacuum pump 6 and emitted into the air in the example shown as FIG. 1, the nitrogen gas can be collected without being emitted into the air if nitrogen gas was necessary.

Figure 6:
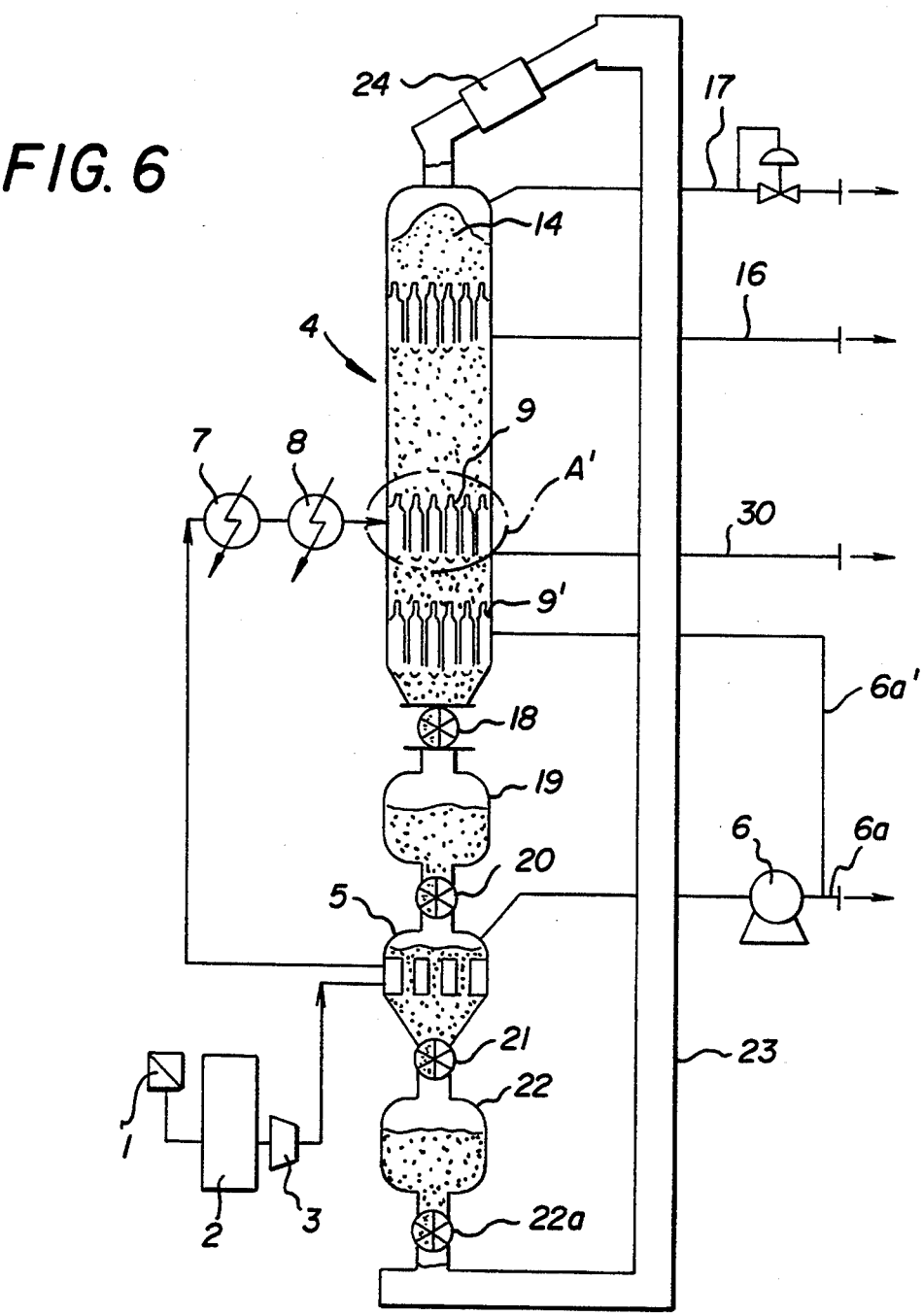
FIG. 6 is a schematic process diagram showing still another embodiment of the present invention.
Figure 7:
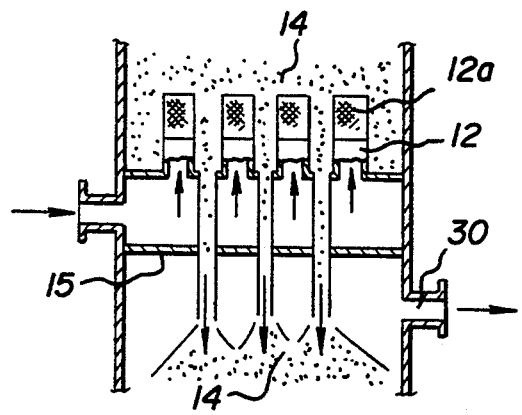
FIG. 7 is an enlarged view of a part A' circled in FIG. 6.

FIG. 6 shows an example of air apparatus for producing product nitrogen gas and product oxygen gas. In the example, the purity of the nitrogen gas is raised, and at the same time, the yield of oxygen is improved by refluxing a part of the product oxygen gas through 6a to the adsorption tower 4 and passing it through the adsorbent 14 again. Describing in further detail, a block (refer to FIG. 2) of the partitioning plate 9 shown in FIG. 1 is taken the place of a block with an exhaust line shown in FIG. 7 while a partitioning plate 9' is reinforced under the block of the partitioning plate 9 in the same way as the block of the partitioning plate 9 shown in FIG. 2, and the block Of the partitioning plate 9' is connected with a reflux line 6a' extended from the exhaust line 6a in the example. And, the nitrogen gas introduced to the lowest block of the partitioning plate 9' by way of the reflux line 6a' is blown upward from nozzles 12 of the partitioning plate 9' into layers of the adsorbent 14 held on the partitioning plate 9', only the nitrogen is adsorbed, and the remainder flows down to the lowest level of the adsorption tower 14 from nozzles 13a while impurities are moved upward and exhausted through the exhaust line 30. The other sections are in the same way as the ones in FIG. 1., and the same reference numerals are given to the same sections. Improvement of the purity of the product nitrogen gas is accomplished in the present example. The purity of the product nitrogen gas obtained in this way was 99.93%. In contrast, the purity of the product nitrogen gas obtained in the fixed-bed PSA apparatus which has about the same performance as the apparatus mentioned in the example was about 88%.

EFFECT OF THE INVENTION

As mentioned hereinbefore, the method of present invention comprises processes of holding up granular adsorbent in a sealed space in a layered state, blowing out material mixed gas into the above granular adsorbent layers from nozzles, making above adsorbent contact with counter-current of the mixed gas by the pressure of the blowout in order to absorb the easily adsorptive gas to the absorbent, transferring the above-mentioned held granular adsorbent which has adsorbed the easily adsorptive gas gradually in order to desorb the easily adsorptive gas and reactivate the adsorbent, and returning the reactivated granular adsorbent into the sealed space such as the adsorption space. Therefore, not alike a separating method employing PSA apparatus currently in use, frequent actions of opening and closing valves are unnecessary, and fluctuations of pressure in the adsorption tower are reduced, so that it became possible to separate and produce stable product gas with excellent purity. Especially, the apparatus disclosed in the present invention is not constituted with a large number of valves, and can be long-lived since frequent actions of opening and closing valves are unnecessary. Also, the purity of the product gas can be kept stable because the fluctuations of the pressure caused by the frequent opening and closing of valves do not occur in the adsorption tower. Moreover, it is possible to obtain a high yield nearly two times better than that in the fixed-bed PSA apparatus currently in use. And, the required space for the site is substantially reduced since the apparatus can be constructed with three-dimensional advantages. Also, in contrast with a continuous adsorption tower (heat reactivation system) although a field of the invention is different thereof, the apparatus of a heat vacuum reactivation system (PTSA) according to the present invention displays efficient reactivation, and, because of a transferring-bed system employing the partitioning plate block which is developed in the invention, powdering of the adsorbent is limited. Besides, it is an advantage that quantity and purity of the product can be easily changed in accordance with demands by variable control of circulating quantity of the adsorbent, rates of reactivation in the reactivation means (vacuum pressure, temperature, and the like) and the like, and that the energy needed is not proportionally followed by losses.

What is claimed is:

1. A method of separating mixed gas which comprises providing granular adsorbent in a first sealed space in a layered state, blowing the mixed gas from nozzles extending into said granular adsorbent layers thereby adsorbing a first gaseous component of the mixed gas that is easily adsorbed to the granular adsorbent and leaving a second gaseous component of the mixed gas that is hardly adsorbed to the granular adsorbent in said first sealed space, gradually transferring the granular adsorbent from said first sealed space to a second sealed space which is pressure sealed from the first sealed space by pressure sealing means, desorbing said first gaseous component from the granular adsorbent in said second sealed space and thereby reactivating the granular adsorbent, and returning the reactivated granular adsorbent to said first sealed space.

2. A method of separating mixed gas according to claim 1 wherein said second sealed space is heated and decompressed.

3. A method of separating mixed gas according to claim 1 or claim 2 wherein mixed gas is compressed by a compressor prior to blowing, and said second sealed space is heated by heat of compression of said compressor.

4. An apparatus for separating mixed gas which comprises:
   an adsorption tower containing granular adsorbent,
   means for introducing a supply of mixed gas to said adsorption tower,
   means for removing a gaseous component separated from said mixed gas from said adsorption tower,
   reactivation means for reactivating said granular adsorbent which communicates with said adsorption tower, and
   means for returning reactivated adsorbent from said reactivation means to said adsorption tower, wherein
   said adsorption tower includes at least two partitioning plates with the granular adsorbent held on top of each of the partitioning plates in a layered stated for countercurrently contacting ascending mixed gas, a space beneath one of said partitioning plates communicating with said means for introducing a supply of mixed gas, said partitioning plates including nozzles for blowing out said mixed gas into the granular adsorbent with open ends of said nozzles positioned in said granular adsorbent and having means for preventing admission of granular adsorbent and said partitioning plates including flow holes for allowing downflow of said granular adsorbent, and said adsorption tower further including means for gradually transferring granular adsorbent to said reactivation means.

* * * * *